United States Patent [19]

Branover

[11] 4,191,901
[45] Mar. 4, 1980

[54] METHOD AND SYSTEM FOR CONVERTING SOLAR ENERGY INTO ELECTRICITY

[75] Inventor: Herman Branover, Beer-Sheva, Israel

[73] Assignee: Ben-Gurion University of the Negev, Beer-Sheva, Israel

[21] Appl. No.: 791,530

[22] Filed: Apr. 27, 1977

[51] Int. Cl.² .......................................... H02K 45/00
[52] U.S. Cl. ....................... 310/11; 60/641; 310/306
[58] Field of Search .................... 310/11, 306; 60/641

[56] References Cited

U.S. PATENT DOCUMENTS

| 659,450 | 10/1900 | McHenry | 60/641 |
|---|---|---|---|
| 784,005 | 2/1905 | Ketchum | 60/641 |
| 2,969,637 | 1/1961 | Rowekamp | 60/641 |
| 3,155,850 | 11/1964 | Meyer | 310/11 |
| 3,158,764 | 11/1964 | Webb | 310/11 |
| 3,294,989 | 12/1966 | Eichenberger | 310/11 |
| 3,320,444 | 5/1967 | Prem | 310/11 |
| 3,407,316 | 10/1968 | Hori | 310/11 |
| 3,443,129 | 5/1969 | Hammitt | 310/11 |
| 3,449,601 | 6/1969 | Tipton | 310/11 |
| 3,453,462 | 7/1969 | Hsu et al. | 310/11 |
| 3,480,804 | 11/1969 | Tipton | 310/11 |
| 3,495,402 | 2/1970 | Yates | 60/641 |

*Primary Examiner*—Donovan F. Duggan
*Attorney, Agent, or Firm*—Lawrence E. Laubscher

[57] ABSTRACT

There is provided a method and a system for converting solar energy into electricity by means of a magnetohydrodynamic (MHD) generator. The method comprises providing an organic liquid reservoir having an ejector nozzle positioned at the inlet port of a MHD generator, providing a liquid alloy reservoir in fluid communication with said inlet port, and heating said organic liquid to its boiling temperature by means of solar energy absorbers so as to form high pressure vapors of the organic liquid adapted to propel the liquid alloy through said MHD-generator, whereby solar heat energy is converted into mechanical energy and said mechanical energy is converted into electrical energy in said generator. The system comprises an organic liquid reservoir having an ejector nozzle positioned at the inlet port of said MHD-generator, a liquid alloy reservoir in fluid communication with said inlet port, a solar energy absorber adapted to heat said organic liquid to a boiling temperature to form vapors adapted to be emitted from said nozzle and to propel the liquid alloy through the MHD-generator wherein solar energy is converted into mechanical energy and mechanical energy is converted into electrical energy.

11 Claims, 2 Drawing Figures

METHOD AND SYSTEM FOR CONVERTING SOLAR ENERGY INTO ELECTRICITY

BRIEF DESCRIPTION OF THE PRIOR ART

The present invention relates to a method and system for converting solar energy into electricity. More particularly the present invention relates to solar energy conversion into electrical energy by means of a magnetohydrodynamic (MHD) generator.

The use of MHD-generators for the production of electrical energy is known. The production of electricity by this technique suffers, however, from the inherent systems' drawback that costly energy is required for accelerating ionized gas or liquid metal through the applied magnetic field in the system in order to produce the electrical energy. For example, when substantially pure plasma is used with such generators, the operating temperatures will be in the order of 3000° C. or more, while when liquid metal is accelerated through the generator by means of plasma produced from fuel combustion, the operating temperatures are about 800° C. to 900° C.

Thus, in addition to the shortcomings of costly fuel conversion into electrical power, the drawbacks and difficulties of operating with such high temperatures, also exist.

SUMMARY OF THE INVENTION

The present invention, therefore, proposes a method and a system wherein electrical power is produced by means of MHD-generators operating at relatively low temperature, i.e. at temperatures in the order of 80° C. to 200° C. and wherein the energy required for accelerating liquid metal through the magnetic field is obtained from solar energy. Thus, in contradistinction to the known electricity generating systems of this kind, it is not necessary to consume fuel for obtaining the required mechanical driving power.

In accordance with the present invention there is provided a method for converting solar energy into electricity by means of a magnetohydrodynamic (MHD) generator, comprising the steps of:

(a) providing an organic liquid reservoir having an ejector nozzle positioned at the inlet port of a MHD generator;

(b) providing a liquid alloy reservoir in fluid communication with said inlet port; and (c) heating said organic liquid to its boiling temperature by means of solar energy absorbers so as to form high pressure vapors of the organic liquid adapted to propel the liquid alloy through said MHD-generator whereby solar heat energy is converted into mechanical energy and said mechanical energy is converted into electrical energy in said generator.

The invention further provides a system for converting solar energy into electricity by means of a magnetohydrodynamic (MHD) generator comprising a MHD-generator, an organic liquid reservoir having an ejector nozzle positioned at the inlet port of said MHD-generator, a liquid alloy reservoir in fluid communication with said inlet port, a solar energy absorber adapted to heat said organic liquid to a boiling temperature to form vapors adapted to be emitted from said nozzle and to propel the liquid metal through the MHD-generator, wherein solar energy is converted into mechanical energy and mechanical energy is converted into electrical energy.

While the invention will now be described in connection with certain preferred embodiments with reference to the following illustrative figures so that it may be more fully understood, it is stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the system and its constituents in more detail than is necessary for a fundamental understanding of the invention, the description taken with the drawings making apparent to those skilled in the art how the several forms of the invention may be embodied in practice.

DETAILED DESCRIPTION

Figures 1, 2:
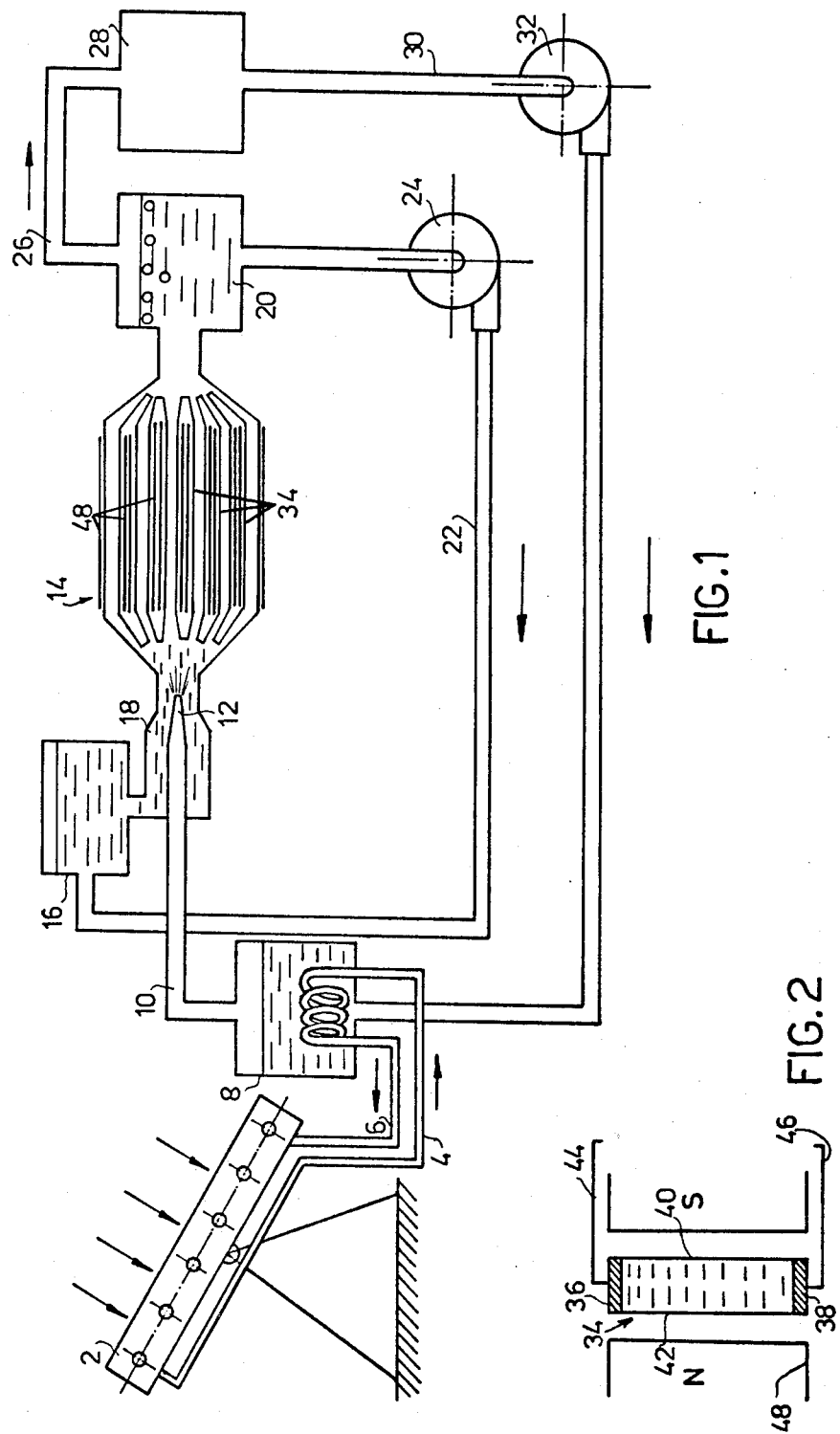
FIG. 1 is a schematic illustration of a system for producing electricity according to the invention.
FIG. 2 is a cross-sectional view of a single MHD-channel and its associated magnets and electrodes.

Referring to the figures, there is shown a plane multi-pipe solar energy absorber 2 having closed loop fluid carrying conduits 4 and 6 leading to and from an organic liquid reservoir 8, and adapted to heat said reservoir to the boiling temperature of said liquid. A suitable organic liquid has been found to by Freon, however other organic liquids having similar properties of inertness and a relatively low boiling point, e.g. a boiling point lower than 100°C., could also be used.

The organic liquid reservoir 8 is fitted with a conduit 10 ending with a converging ejector nozzle 12, which nozzle is positioned at the inlet port of a MHD-generator 14. There is also provided a liquid alloy reservoir 16, for example, a NaK reservoir, having a feeding conduit 18 leading to the inlet port of the generator 14. The outlet of the generator communicates with a separator 20 and the liquid alloy, after being separated from organic vapors, is recycled back into the reservoir 16 via a liquid pipe 22 and where necessary, by means of a pump 24. The separated vapors from separator 20 are passed through a conduit 26 to a condenser 28 and the condensed organic liquid is returned through pipe 30 and by means of a pump 32 to the reservoir 8 for reuse.

A preferred construction of the D.C. MHD-generator is shown in the Figures. It consists of a multiplicity of parallelly disposed channels 34. Each of the channels is of rectangular, high aspect ratio cross-section having two oppositely disposed walls made of electroconductive material, thus constituting two electrodes 36 and 38 and the two other walls 40 and 42 are made of an insulating material. Output leads 44 and 46 are respectively connected to electrodes 36 and 38. Each of the channels 34 are placed in the gap of a permanent magnet 48. Considering a channel of a height of 10 cm., an induction of a magnetic field of about 2000 Gauss, and a flow velocity in the channel of about 50 m/sec., there may be obtained a potential between the electrodes of about 1 volt. Thus if several of the channels' electrode leads are connected series higher voltages could be obtained.

The operation of the system can now be readily understood. Liquid, for example, water, contained in the absorber's closed loop conduit is heated up by solar energy and circulated in conduits 4 and 6 to heat up the organic liquid in reservoir 8 to its boiling temperature, (which is about 80° C. for Freon). The organic vapors thus formed are passed through conduit 10 and ejected from the nozzle 12 with a velocity between 50 to 100 m/sec. The ejected jet of vapor accelerates the liquid alloy present at the inlet port of the MHD-generator through the channels of the latter, thus converting heat into mechanical energy and in turn, said mechanical energy into electricity. The two phase flow at the outlet port of the generator is then separated, the vapors are condensed and each of the liquids are recycled to their respective reservoir for reuse.

Alternatively, in accordance with another embodiment, not shown in the figures, the propelled two phase flow of vapors and liquid alloy may be separated prior to passing the liquid allow through the generator. Accordingly, between the ejector nozzle and conduit 18, and the input port of the generator there may be be installed a mechanical separator, for example, a circular forked channel (i.e., a cyclone type separator), the input of which is coupled to said nozzle and conduit 18. In such an arrangement, one branch of the circular channelled separator is coupled to the inlet port of the generator and the second branch to a condenser and, in turn, to the organic liquid reservoir. With this type of an arrangement, the propelled two phase flow is first separated by virtue of the distinct flow of each of said two phases in such a circular separator as is known per-se in the art, and consequently only the propelled liquid alloy passes through the generator and thereafter is recycled to its reservoir, while the propelling organic liquid vapors do not pass through the generator but are condensed and the liquid is similarly recycled to its reservoir.

In another possible modification, the organic liquid reservoir can be heated up to its boiling temperature by means of, for example, solar absorbers covering the walls of the reservoir or by means of parabolic or spherical mirror solar energy absorbers. When such parabolic absorbers are used, the working temperature of the propelling liquid could be in the order of 160° C. to 180° C.

While particular embodiments of the invention have been described and shown with reference to the figures it will be evident to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A method for converting solar energy into electricity by means of a magnetohydrodynamic (MHD) generator, comprising the steps of:
   (a) providing an organic liquid reservoir having an ejector nozzle positioned at the inlet port of a MHD generator;
   (b) providing a liquid alloy reservoir in fluid communication with said inlet port;
   (c) providing a solar energy absorber and heating said organic liquid to its boiling temperature by means of the solar energy absorbed by said absorber so as to form high pressure vapors of the organic liquid;
   (d) directing the organic liquid vapors through said liquid alloy so as to form a two-phase mixture of a discontinuous vapor phase and a continuous liquid alloy phase and to propel said mixture through said MHD - generator;
   (e) separating the vapors from the two-phase mixture;
   (f) condensing said vapors into liquid; and
   (g) recycling the organic liquid and the separated alloy liquid to their respective reservoirs, whereby solar heat energy is converted into mechanical energy and said mechanical energy is conterted into electrical energy in said generator.

2. The method as claimed in claim 1 wherein said solar energy absorber is adapted to heat liquid disposed therein and to effect movement of said heated liquid through conduit means to heat said organic liquid.

3. The method as claimed in claim 2 wherein said organic liquid is adapted to boil at a temperature below the boiling temperature of the liquid disposed in said absorber.

4. The method as claimed in claim 3 wherein the liquid disposed in said absorber is water and said organic liquid is adapted to boil at a temperature below the boiling temperature of said water.

5. The method as claimed in claim 1 wherein said liquid alloy is a liquid NaK alloy.

6. A method for converting solar energy into electricity by means of a magnetohydrodynamic (MHD) generator, comprising the steps of:
   (a) providing an organic liquid reservoir having an ejector nozzle adapted to emit organic liquid vapors;
   (b) providing a liquid alloy reservoir in fluid communication with said ejector nozzle;
   (c) providing a solar energy absorber and heating said organic liquid to its boiling temperature by means of the solar energy absorbed by said absorber so as to form high pressure vapors of the organic liquid;
   (d) directing said organic - liquid vapors through said liquid alloy to form a jet of two-phase mixture of a discontinuous vapor phase and a continuous liquid alloy phase;
   (e) directing a jet of said mixture into a separator wherein the vapors are separated from the liquid alloy while the propelled liquid metal is directed to pass through said MHD - generator:
   (f) condensing said vapors into liquid; and
   (g) recycling the organic liquid and the separated alloy liquid to their respective reservoirs whereby solar heat energy is converted into mechanical energy and said mechanical energy is converted into electric energy in said generator.

7. A system for converting solar energy into electrical energy, comprising
   (a) a magnetohydrodynamic generator (14) having inlet and outlet ports;
   (b) liquid alloy reservoir means (16) for supplying a liquid alloy to said inlet port;
   (c) organic liquid reservoir means (8) for storing a quantity of an organic liquid having a boiling temperature less than that of water;
   (d) solar energy absorption means (2, 46) responsive to the energy of the sun for boiling the organic liquid in said organic liquid reservoir to the vapor phase;
   (e) ejector nozzle means (12) for directing the organic liquid, vapors through said liquid alloy to form a jet of a two-phase mixture of a discontinuous vapor phase and a continuous liquid alloy phase and to propel said liquid alloy through the magnetohydrodynamic generator;

(f) separator means for separating the vapors from the two-phase mixture;

(g) condensing means for condensing said vapors into liquid; and (h) recycling means for returning the organic liquid and the alloy liquid to their respective reservoirs, whereby solar energy is converted into mechanical energy, and mechanical energy is converted into electrical energy.

8. The system as claimed in claim 7, wherein said solar energy absorber is adapted to heat liquid disposed therein and to effect movement of said heated liquid through conduit means to heat said organic liquid.

9. The system as claimed in claim 7, wherein said MHD-generator includes a plurality of parallelly disposed electricity producing liquid carrying channels, said channels being electrically connected in series.

10. The system as claimed in claim 7, wherein permanent magnets are utilized in said MHD-generator for applying the necessary magnetic field to the liquid alloy-carrying-channels thereof.

11. The system as claimed in claim 7, wherein the separator means is positioned between the liquid alloy reservoir, wherein the MHD generator and said mixture is propelled through said separator, and further wherein the liquid alloy is separated from the propelling vapors during its propelled flow and substantially only said liquid alloy is directed to said magnetohydrodynamic generator.

* * * * *